United States Patent
Domzalski et al.

[11] Patent Number: 5,938,404
[45] Date of Patent: Aug. 17, 1999

[54] OSCILLATING AIR JETS ON AERODYNAMIC SURFACES

[75] Inventors: David B. Domzalski, Gilbert; Ahmed A. Hassan; Dennis K. Kennedy, both of Mesa, all of Ariz.

[73] Assignee: McDonnell Douglas Helicopter Company, Mesa, Ariz.

[21] Appl. No.: 08/869,372

[22] Filed: Jun. 5, 1997

[51] Int. Cl.⁶ .................................................. B64C 27/04
[52] U.S. Cl. .............................. 416/91; 416/90 A; 416/3; 416/42; 416/500; 415/119; 244/130; 244/199; 244/204
[58] Field of Search ..................... 416/3, 23, 24, 416/90 R, 90 A, 91, 42, 20 R, 155, 500; 415/119, 914; 310/311, 324, 328, 348; 381/173, 190; 244/198, 199, 204, 207, 208, 130

[56] References Cited

U.S. PATENT DOCUMENTS

| | | |
|---|---|---|
| 2,071,012 | 2/1937 | Adams . |
| 2,397,132 | 3/1946 | Dent, Jr. . |
| 2,892,502 | 6/1959 | Donovan . |
| 3,451,644 | 6/1969 | Marchetti et al. . |
| 3,509,971 | 5/1970 | Gerstine et al. . |
| 3,954,229 | 5/1976 | Wilson . |
| 4,228,379 | 10/1980 | Guscott et al. ............... 310/322 |
| 4,386,241 | 5/1983 | Maeda ............................ 310/324 |
| 4,514,143 | 4/1985 | Campbell . |
| 4,516,747 | 5/1985 | Lurz ............................... 244/204 |
| 4,580,210 | 4/1986 | Nordstrom . |
| 4,706,902 | 11/1987 | Destuynder et al. . |
| 4,786,836 | 11/1988 | Tokushima ................... 310/328 |
| 4,802,642 | 2/1989 | Mangiarotty ................. 244/204 |
| 4,989,810 | 2/1991 | Meier et al. .................. 244/208 |
| 5,031,222 | 7/1991 | Takaya ........................... 381/190 |
| 5,320,491 | 6/1994 | Coleman et al. . |
| 5,529,458 | 6/1996 | Humpherson ................ 416/20 R |
| 5,588,800 | 12/1996 | Charles et al. . |
| 5,747,906 | 5/1998 | Tajima et al. ................. 310/324 |
| 5,791,601 | 8/1998 | Dancila et al. ............... 244/207 |
| 5,804,906 | 9/1998 | Tsutsumi ...................... 310/328 |

FOREIGN PATENT DOCUMENTS

| | | | |
|---|---|---|---|
| 61-88699 | 5/1986 | Japan ........................ 381/190 |
| 1761973 | 9/1992 | U.S.S.R. .................... 416/90 R |

*Primary Examiner*—Christopher Verdier
*Attorney, Agent, or Firm*—Stout, Uxa, Buyan & Mullins, LLP; Donald E. Stout

[57] ABSTRACT

An active control device for use on an aerodynamic structure is provided. The aerodynamic structure includes an outer aerodynamic skin and an interior volume, wherein the outer aerodynamic skin surrounds the interior volume. The active control device includes at least one aperture disposed on the outer aerodynamic skin and a diaphragm disposed in the interior volume of the aerodynamic structure. The at least one aperture connects the outer aerodynamic skin to the interior volume, and the diaphragm in the interior volume is movable between a first position and a second position. Movement of the diaphragm from the first position to the second position pushes air through the at least one aperture and out of the interior volume. Movement of the diaphragm from the second position to the first position draws air through the at least one aperture and into the interior volume. The diaphragm may be circular, or may be oval-shaped.

57 Claims, 6 Drawing Sheets

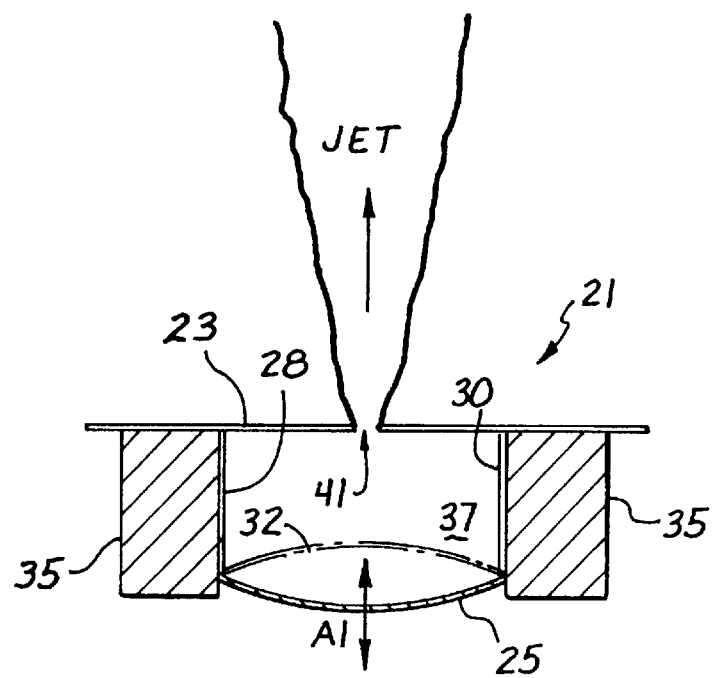
Fig. 1
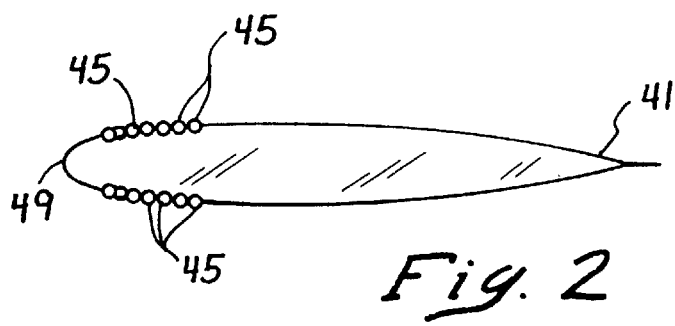
Fig. 2
Fig. 3
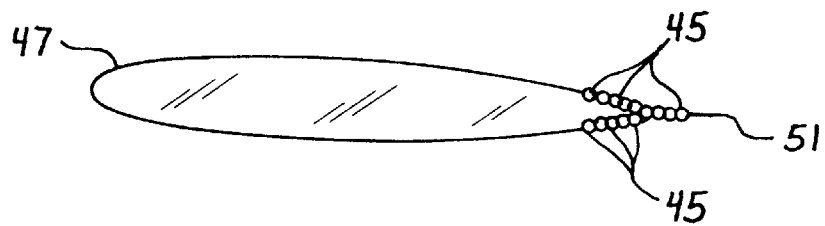

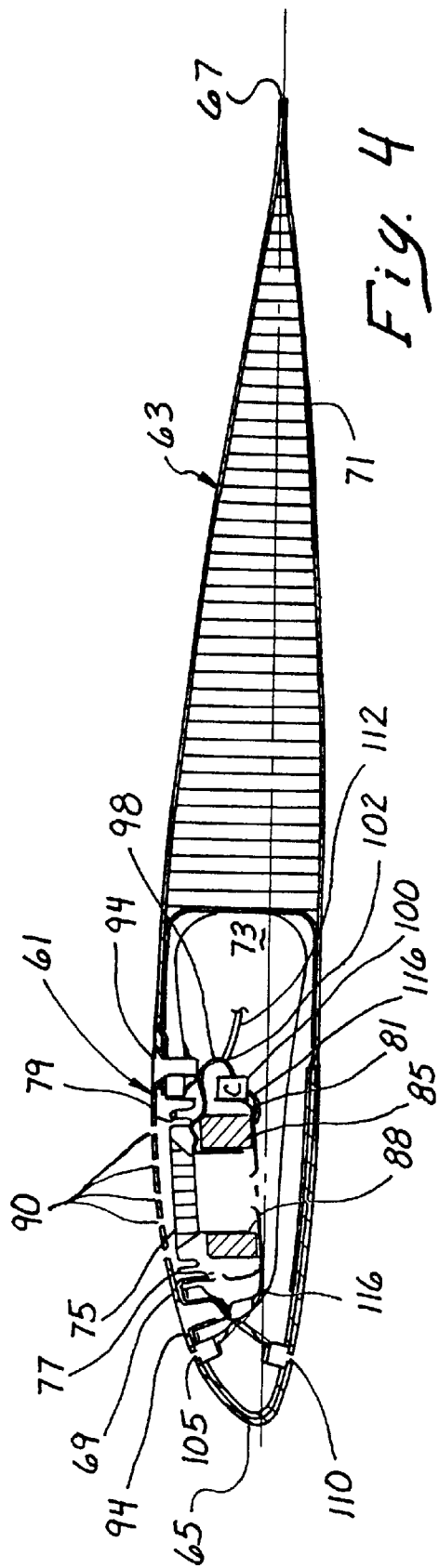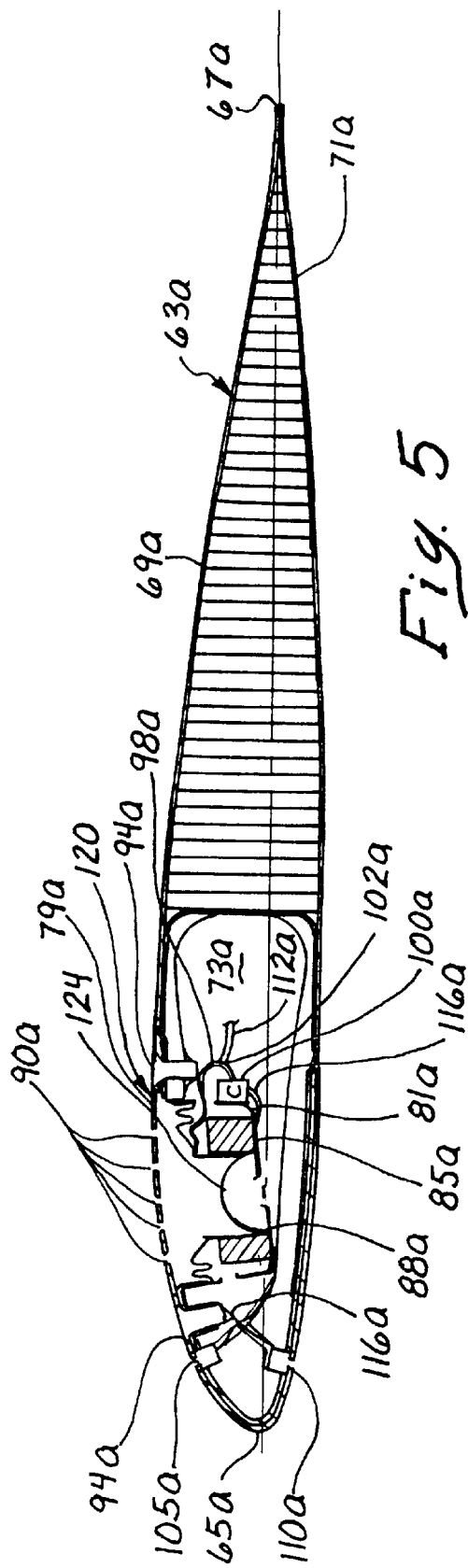

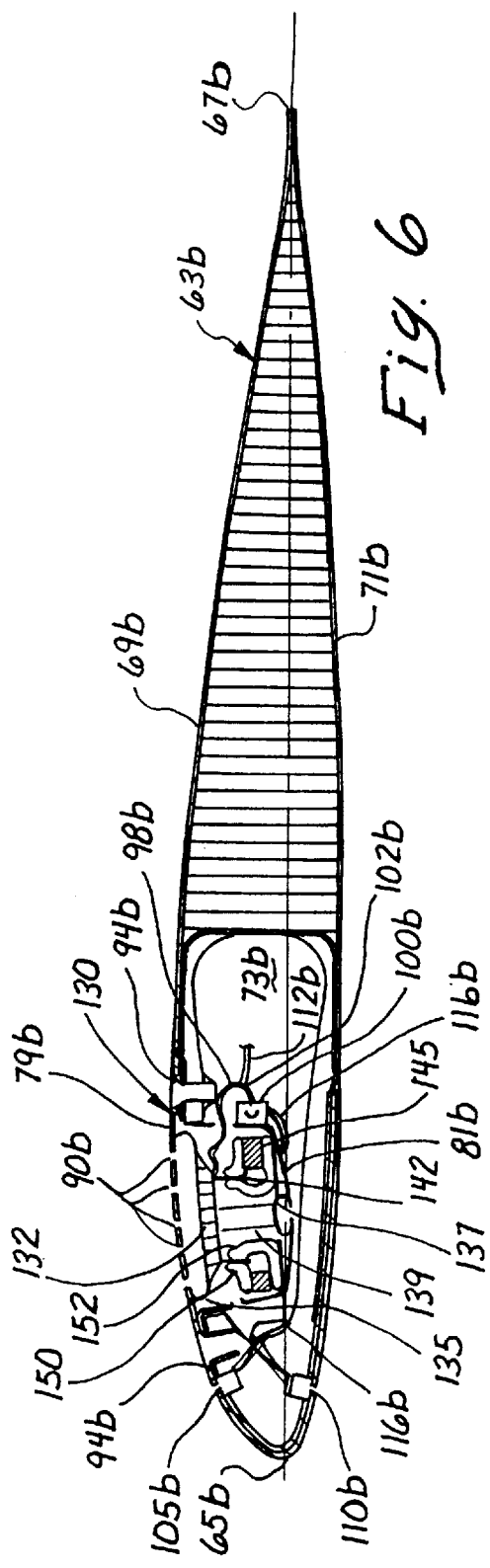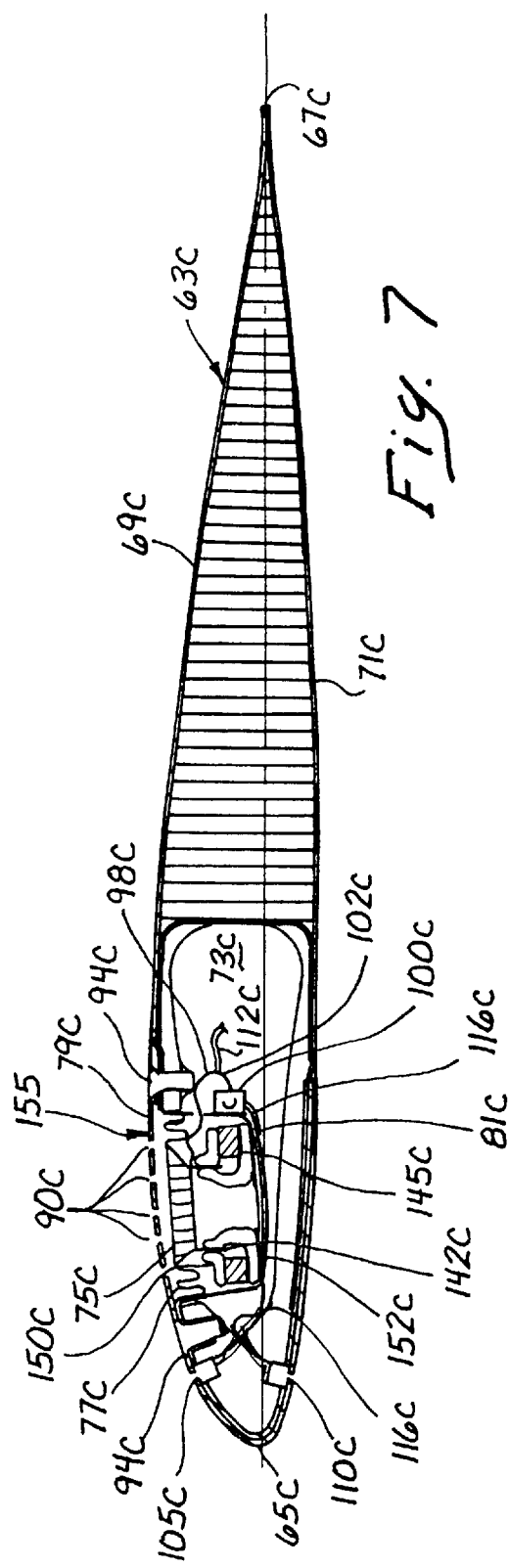

OSCILLATING AIR JETS ON AERODYNAMIC SURFACES

This application is related to U.S. application Ser. No. 08/251,329, filed on May 31, 1994 and entitled *BLADE VORTEX INTERACTION NOISE REDUCTION TECHNIQUES FOR A ROTORCRAFT*, which issued into U.S. Pat. No. 5,588,800; co-pending U.S. application Ser. No. 08/727,980, filed on Oct. 9, 1996 and entitled *ACTIVE BLOWING SYSTEM FOR ROTORCRAFT BLADE VORTEX INTERACTION NOISE REDUCTION;* which issued into U.S. Pat. No. 5,813,625 and co-pending U.S. application Ser. No. 08/869,725, filed on Jun. 5, 1997 and entitled *OSCILLATING AIR JETS FOR HELICOPTER ROTOR AERODYNAMIC CONTROL AND BVI NOISE REDUCTION;* all of which are commonly assigned and the contents of which are expressly incorporated herein by reference.

BACKGROUND OF THE INVENTION

1. Field of the Invention

This invention relates generally to aerodynamic surfaces and, more particularly, to improved constructions and control schemes for such aerodynamic surfaces which provide for aerodynamic control and for significant reductions in noise and vibration in the case of rotor blades.

2. Description of Related Art

Conventional helicopters in descent flight conditions frequently generate an impulsive noise signature which is commonly referred to as blade-vortex interactions (BVI) noise or "blade slap." BVI noise is generated by blade tip vortices, which interact with the rotor blades. Unfortunately, it is typically within a frequency range which is highly important to human subjective response. Additionally, it is easily detected electronically at large distances, thus increasing the vulnerability of military rotorcraft. Consequently, a reduction in the BVI noise intensity and changes in the noise signature, using active and/or passive noise control techniques, is desirable to the rotorcraft industry, which is challenged by today's stringent military and civilian acoustic regulations.

There are three possible measures which may be taken to reduce BVI noise. Namely, the tip vortex strength may be weakened, the separation distance between the blade and the tip vortex may be increased, and/or the blade geometry may be altered. The result of these measures is a decrease in the strength of the interaction between the rotor blade and the tip vortices. Existing devices which have been used for reducing BVI noise include the use of a blade-mounted trailing edge flap which seeks to change the strength of the tip vortex and hence the intensity of BVI and the use of Higher Harmonic root pitch control (HHC), which seeks to change the blade/tip vortex separation distance, and thus the local aerodynamic conditions, through blade pitch changes.

Other control means concentrate primarily on reducing the strength of the tip vortex through blade tip geometric modifications. Typical examples are the use of leading and trailing edge sweep, the use of blade anhedral, spoilers, and the use of a subwing concept. All of these examples, excluding HHC, may be classified as passive control techniques. An example of another active control technique would be the use of tip air mass injection, which again has the purpose of weakening the blade tip vortices. Tip air mass injection involves introducing a high energy air jet at the tip of the blade, aimed at the center or core of the tip vortex with the sole purpose of diffusing or weakening its strength.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in descent rate and forward flight speed. Additionally, most of the passive prior art solutions to the BVI problem are deployed at all times, whether or not needed, often degrading flight performance unnecessarily.

In addition to problems associated with reducing BVI noise generated by rotor blades, a more general problem exists with providing controllable aerodynamic surfaces on rotor blades, wings, engine inlets, and nozzles. Movable control surfaces placed on these aerodynamic surfaces have included flaps, slats, spoilers, ailerons, elevators, and rudders. Although these control surfaces can mechanically alter the geometry of the original aerodynamic device, they are limited in ability to respond quickly and efficiently. Prior art mechanical control surfaces can add mechanical complexity to the aircraft, can compromise structural integrity, can complicate manufacturing, and can compromise radar detectability.

A synthetic jet includes a movable diaphragm positioned within a chamber. Movement of the diaphragm pulses air in and out of the chamber through an orifice. Prior art synthetic jets typically incorporate a piezoelectric diaphragm, which favors oscillation frequencies between 1 kHz and 14 kHz. These piezoelectric-based synthetic jets consequently have relatively low displacement and energy output capabilities. Piezoelectric devices are typically used in the loud speaker industry for high-frequency sounds where the energy level is relatively low. Although synthetic jets have been used in the prior art for mixing two streams of air, synthetic jets have not, to Applicants' knowledge, been incorporated on aerodynamic surfaces for providing aerodynamic control and/or reducing BVI noise.

SUMMARY OF THE INVENTION

This invention addresses the aforementioned problems by providing a BVI noise reduction device which has a number of advantages over prior art solutions. The invention, a porous surface on the rotor blade driven with positive and negative pressures, is designed to be used as an active control device which alleviates the aerodynamics of the interactions and thus the impulsive BVI noise levels and signature. The porous surfaces can be driven with positive and/or negative pressures either continuously or when predetermined flight conditions are present. The porous surface can be used on the aerodynamic surfaces of rotor blades and on other aerodynamic surfaces, such as wings, engine inlets, and nozzles.

According to one aspect of the present invention, an active control device for use on an aerodynamic structure is disclosed. The aerodynamic structure includes an outer aerodynamic skin and an interior volume, wherein the outer aerodynamic skin surrounds the interior volume. The active control device includes at least one aperture disposed on the outer aerodynamic skin and a diaphragm disposed in the interior volume of the aerodynamic structure. The at least one aperture connects the outer aerodynamic skin to the interior volume, and the diaphragm in the interior volume is movable between a first position and a second position. Movement of the diaphragm from the first position to the second position pushes air through the at least one aperture and out of the interior volume. Movement of the diaphragm from the second position to the first position draws air through the at least one aperture and into the interior volume. The diaphragm may be circular or may be, for example, oval-shaped. In the case of an oval-shaped diaphragm used in connection with a rotor blade, for example, the diaphragm may comprise an oblong shape, which is oriented in a direction along a length of the rotor blade. The at least one aperture can include a plurality of apertures disposed on the outer aerodynamic skin. The diaphragm can comprise either a piezoelectric material, a rigid piston, a nickel hydroform material having a cone shape, or a variety of other shapes and compositions.

In the case where the diaphragm comprises a rigid piston, the rigid piston may comprise an aluminum honeycomb composition, for example. The rigid piston may be coupled to the outer aerodynamic skin with another diaphragm that is flexible.

According to one aspect of the present invention, an active control device for reducing blade-vortex-interaction (BVI) noise generated by a rotorcraft includes a diaphragm, a rigid piston, a wall, and a wire. The active control device is adapted to be installed into a rotor blade of the rotorcraft. A skin on the rotor blade forms an aerodynamic surface and surrounds an inner volume within the rotor blade. The diaphragm is disposed within the inner volume, and includes both an outer periphery and an inner periphery. The outer periphery is adapted to be coupled to the skin of the rotor blade, and the rigid piston is connected to the inner periphery of the diaphragm. The wall is coupled to the rigid piston, and the wire is wound around the wall.

In one embodiment, the diaphragm comprises an annular shape, the rigid piston comprises a circular shape, and the wall comprises a cylindrical shape. In another embodiment, the diaphragm comprises an oval shape, the wall comprises a cylindrical shape with an oval cross section, and the rigid piston comprises an oval shape. In either embodiment, the wall comprises a first maximum diameter, the rigid piston comprises a second maximum diameter, and a ratio of the first maximum diameter to the second maximum diameter can be equal to about one half and, more particularly, can be equal to about 0.67. Due in part to these dimensions, the rigid piston is adapted to generate pressures which are on an order of magnitude greater than pressures that a conventional loud speaker can generate.

The active control device can further include a second diaphragm coupled to the rigid piston. While the first diaphragm in this embodiment couples the rigid piston to the skin of the rotor blade, the second diaphragm couples the rigid piston to a chassis. A connecting member extends radially from the rigid piston toward the chassis and connects the second diaphragm to the chassis.

The active control device can further include an aerodynamic planar member and a plurality of apertures disposed within the aerodynamic planar member. The aerodynamic planar member is adapted to fit adjacent to and to form a part of the skin. The outer periphery of the diaphragm is coupled to the aerodynamic planar member and, more particularly, the outer periphery of the diaphragm is coupled to the skin of the rotor blade via the aerodynamic planar member.

The chassis of the active control device is connected to the skin of the rotor blade, and a magnet is coupled to the chassis. The magnet comprises an annular shape, and both the wall and the wire are adapted to fit within the elliptical-shaped magnet.

The rigid piston is movable between a first configuration and a second configuration. Movement of the rigid piston from the first configuration to the second configuration pushes air away from the rigid piston and out through the plurality of apertures, and movement of the rigid piston from the second configuration to the first configuration draws air toward the rigid piston and in through the plurality of apertures.

According to another aspect of the present invention, an active control device for reducing BVI noise generated by a rotorcraft includes a diaphragm, a wall, a coil, and a magnetic field producing member. The active control device is adapted to be installed into a rotor blade of the rotorcraft, and the rotor blade includes a skin forming both an aerodynamic surface of the rotor blade and an inner volume. The diaphragm includes a center point, a perimeter, a first surface, and a second surface opposite to the first surface. The wall is coupled to the second surface of the diaphragm, and comprises a center and a perimeter. The centers of the diaphragm and the wall are placed into close proximity when the wall is coupled to the second surface of the diaphragm, and the perimeter of the wall does not extend beyond the perimeter of the diaphragm when the wall is coupled to the second surface of the diaphragm. The coil is wound around the wall, and the magnetic field producing member is disposed around both the wall and the coil. The wall and the coil are movable within the magnetic field producing member to thereby facilitate movement of the diaphragm.

The active control device further includes a sealed chamber connecting the diaphragm to the aerodynamic surface. At least one aperture is formed in the aerodynamic surface, and movement of the diaphragm results in corresponding movement of air into and out of the at least one aperture. In one embodiment, the diaphragm is disposed ahead of a quarter chord location of the rotor blade near to but not on the leading edge, and in another embodiment the diaphragm is disposed in close proximity to the trailing edge of the rotor blade. The diaphragm is adapted to oscillate at a variety of different frequencies. In one embodiment, the diaphragm is adapted to oscillate at a frequency of about 800 Hz. A power supply is coupled to the diaphragm for driving the diaphragm.

According to yet another aspect of the present invention, an active control device includes at least one aperture and a diaphragm positioned in close proximity to the at least one aperture for pulsing air into and out of the at least one aperture. The at least one aperture is formed on an aerodynamic surface. The active control device includes means coupled to the aerodynamic surface for generating a fixed magnetic field, and means coupled to the diaphragm for generating a changing magnetic field. A power supply is coupled to the means for generating a changing magnetic field. The means for generating a fixed magnetic field can comprise an elliptical-shaped magnet, and the means for generating a changing magnetic field can comprise a wound coil connected to the diaphragm.

The present invention, together with additional features and advantages thereof, may best be understood by reference to the following description taken in connection with the accompanying illustrative drawings.

BRIEF DESCRIPTION OF THE DRAWINGS

FIG. 1 is a cross-sectional view of an oscillating air jet assembly comprising a piezoelectric membrane in accordance with the present invention;

FIG. 2 is a schematic cross-sectional view of a rotor blade having a plurality of oscillating air jet assemblies near a leading edge thereof;

FIG. 3 is a schematic cross-sectional view of a rotor blade having a plurality of oscillating air jet assemblies near a trailing edge thereof;

FIG. 4 is a cross-sectional view of a rotor blade having an oscillating air jet assembly disposed therein in accordance with a first embodiment of the present invention;

FIG. 5 is a cross-sectional view of a rotor blade having an oscillating air jet assembly disposed therein in accordance with a second embodiment of the present invention;

FIG. 6 is a cross-sectional view of a rotor blade having an oscillating air jet assembly disposed therein in accordance with a third embodiment of the present invention;

FIG. 7 is a cross-sectional view of a rotor blade having an oscillating air jet assembly disposed therein in accordance with a fourth embodiment of the present invention;

DETAILED DESCRIPTION OF THE PRESENTLY PREFERRED EMBODIMENTS

Figure 8:
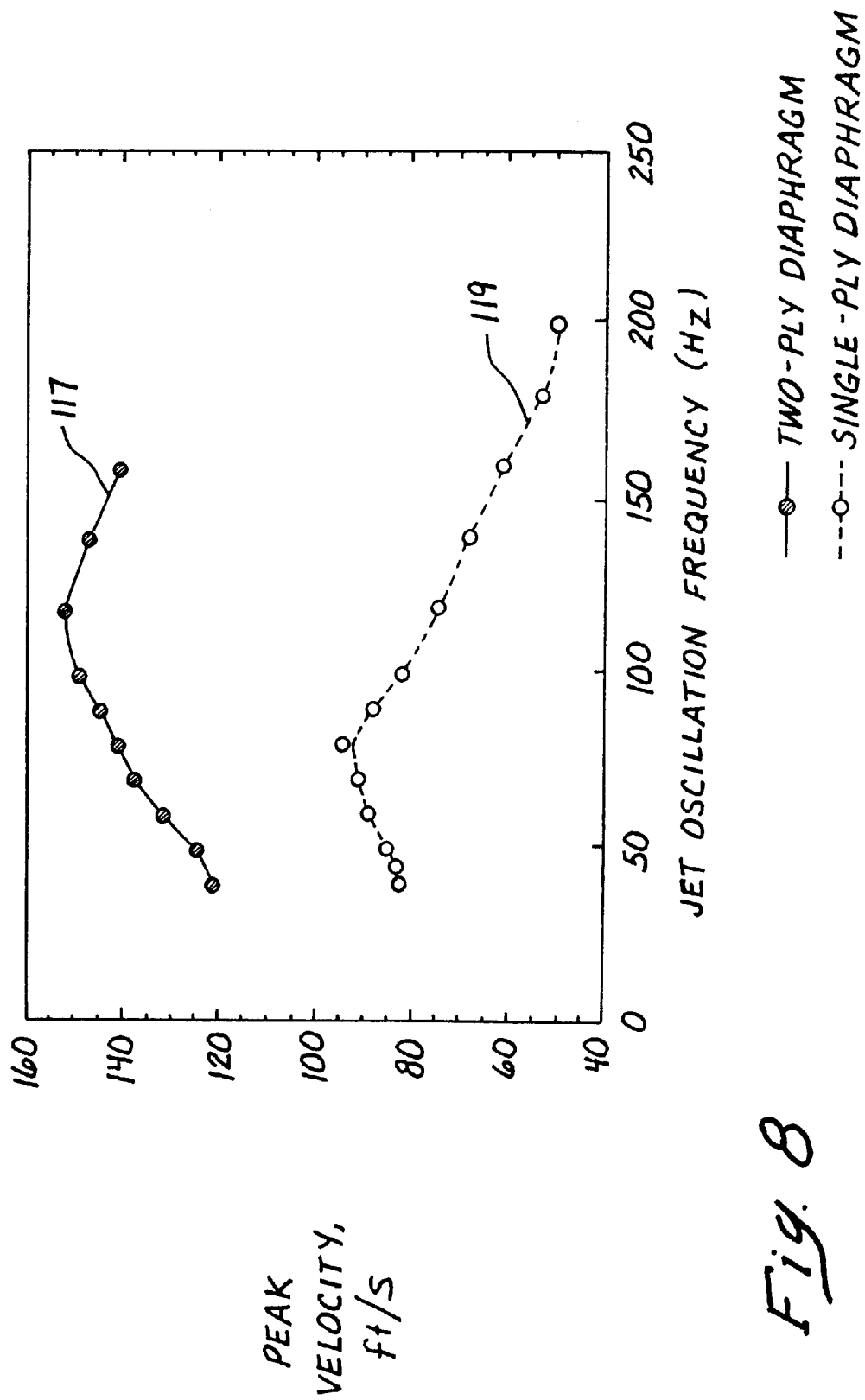
FIG. 8 illustrates results obtained from computational fluid dynamics simulations of air flow past rotor blades incorporating oscillating air jet assemblies in accordance with the present invention.
Figure 9:
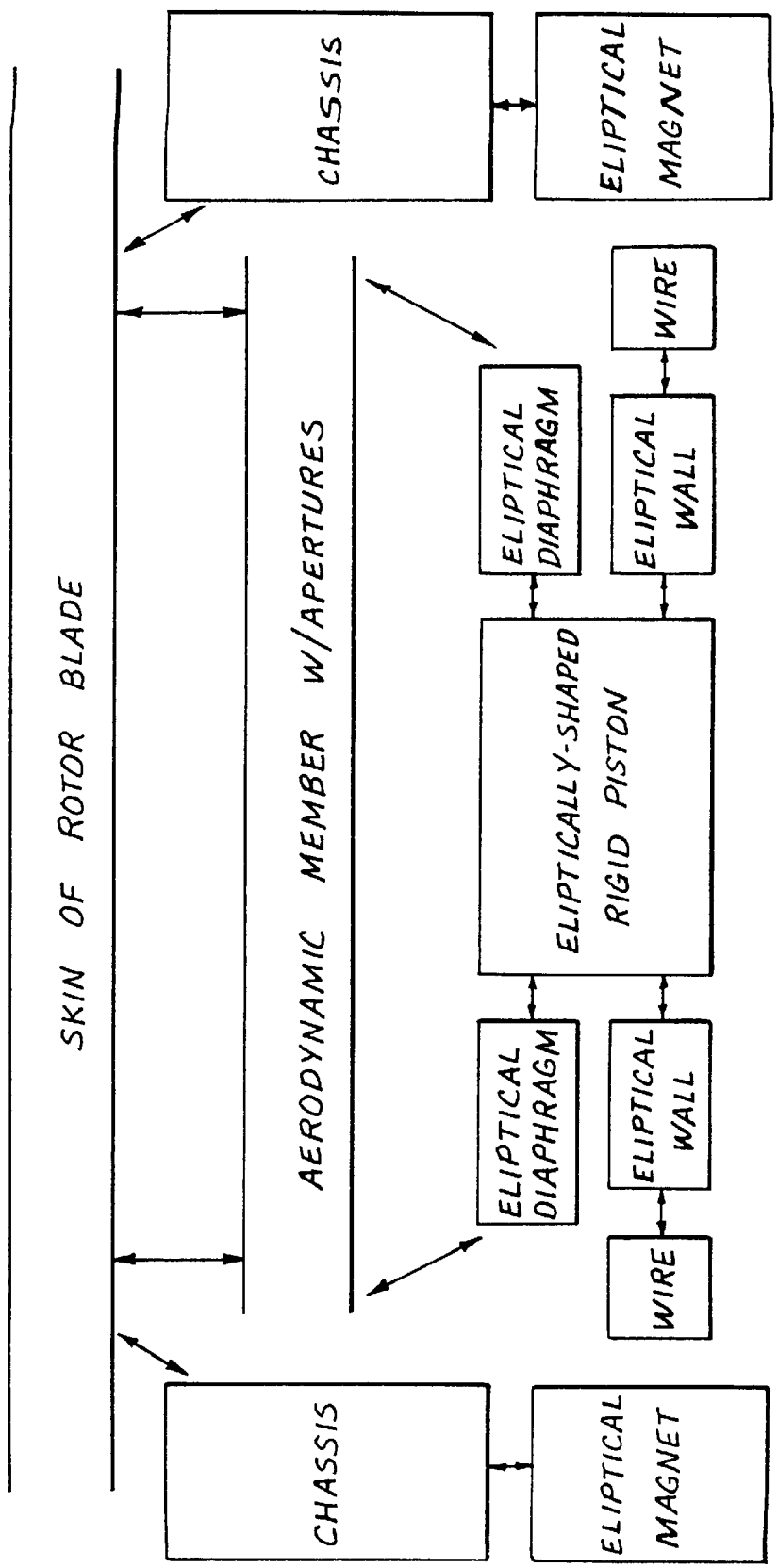
FIG. 9 is a block diagram illustrating an elliptically-shaped rigid piston disposed in a rotor blade in accordance with a fifth embodiment of the present invention.
Figure 10:
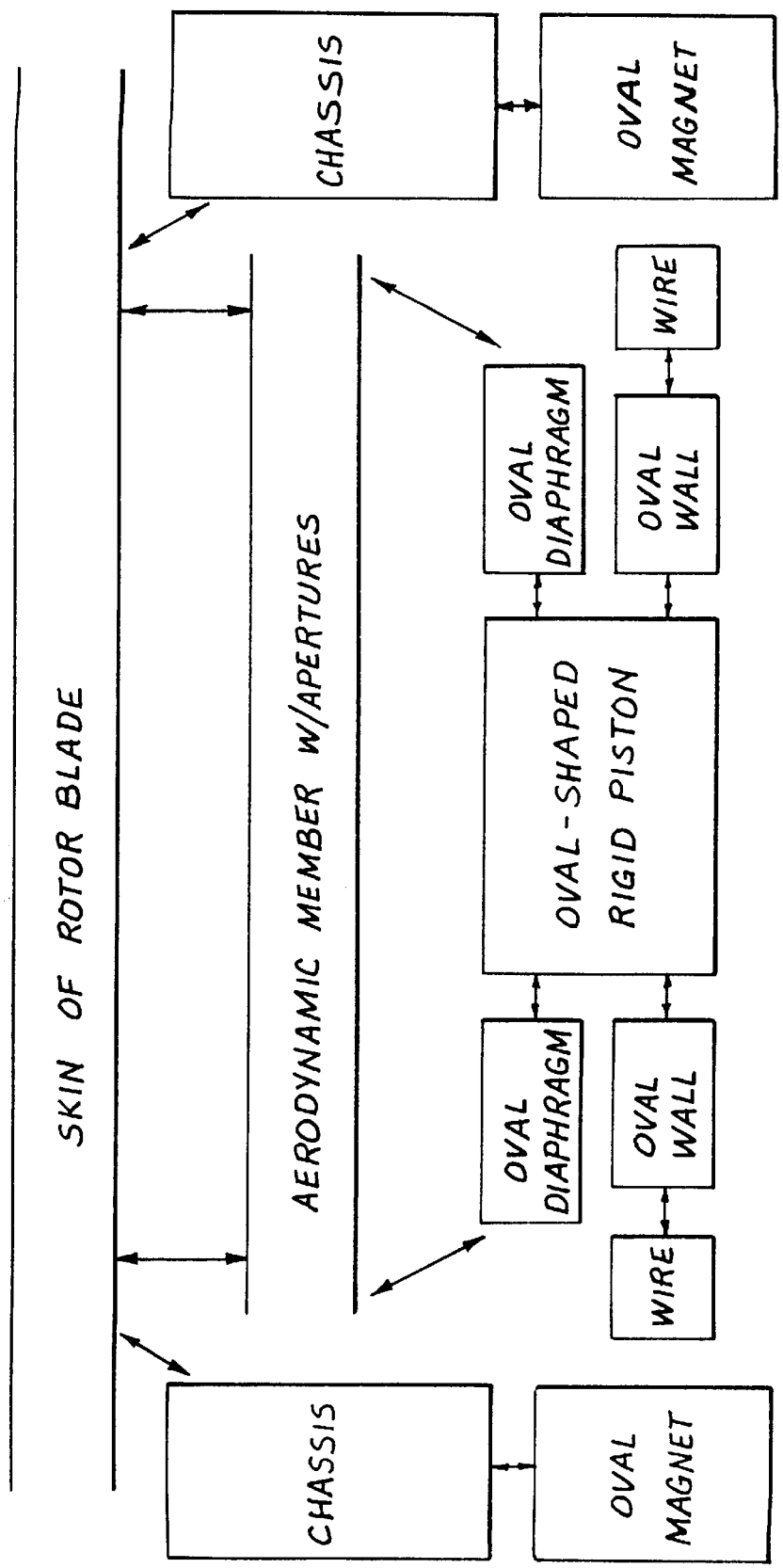
FIG. 10 is a block diagram illustrating an oval-shaped rigid piston disposed in a rotor blade in accordance with a sixth embodiment of the present invention.

Referring now more particularly to the drawings, FIG. 1 illustrates an oscillating air jet assembly 21 which is disposed on an aerodynamic surface 23. The oscillating air jet assembly 21 comprises a diaphragm 25 formed of a piezoelectric material or, any other non-permeable material. The diaphragm 25 is preferably supported between a first conductor 28 and a second conductor 30, and is movable in the directions of the arrows A1 between a first position indicated by the reference numeral 25 and a second position indicated by the phantom lines 32.

A chassis 35 secures the first conductor 28 and the second conductor 30 to the aerodynamic surface 23. An oscillating current can be provided to the diaphragm 25 via the first conductor 28 and the second conductor 30, to thereby electrically stimulate the diaphragm 25 to oscillate in directions of the arrows A1.

Movement of the diaphragm from a first position to a position 32 shown in phantom produces a positive pressure within the sealed chamber 37, and movement of the diaphragm in the opposite direction produces a negative pressure in the sealed chamber 37. An aperture 41 is formed in the aerodynamic surface 23 to facilitate movement of air out of and into the sealed chamber 37, in response to the positive and negative pressures generated within the sealed chamber 37 by the diaphragm 25.

When the diaphragm 25 moves in a direction toward the aerodynamic surface 23 a positive pressure is produced within the sealed chamber 37, resulting in a flow of air out of the aperture 41. Similarly, when the diaphragm 25 moves away from the aerodynamic surface 23 a negative pressure within the sealed chamber 37 is established and, consequently, air is drawn into the sealed chamber 37 through the aperture 41.

The resulting oscillation of air into and out of the sealed chamber 37 through the aperture 41, as a result of the oscillating diaphragm 25, is referred to as a zero-mass jet or, alternatively, as an oscillating air jet assembly. The zero-mass jet of FIG. 1 preferably comprises a net mass of air flow into and out of the aperture 41 which is equal to zero during one complete cycle of oscillation of the diaphragm 25.

With reference to FIGS. 2 and 3, arrays of oscillating air jet assemblies 45 can be placed on a rotor blade 47 in a variety of different locations. The cross-sectional view of FIG. 2 illustrates a plurality of oscillating air jet assemblies 45 disposed on an upper surface of the rotor blade near a leading edge 49. An additional array of oscillating air jet assemblies 45 is disposed on a bottom surface of the rotor blade 47 near the leading edge 49.

FIG. 3 illustrates an array of oscillating air jet assemblies 45 disposed on an upper surface of the rotor blade 47 near a trailing edge 51 of the rotor blade 47, and further illustrates an array of oscillating air jet assemblies 45 on a bottom surface near the trailing edge 51 of the rotor blade 47. The oscillating air jet assemblies 45 of FIG. 2 may be disposed on only one, or both, of the two surfaces of the rotor blade 47 in alternative embodiments. Similarly, either or both of the arrays of oscillating air jet assemblies 45 may be disposed near the trailing edge 51 of the rotor blade 47.

Placement of the oscillating air jet assemblies 45 on either the upper, the lower, or both surfaces of the rotor blade 47 results in substantial changes to the original aerodynamic characteristics of the rotor blade 47. Similar effects are achieved by placing the oscillating air jet assemblies 45 on other aerodynamic surfaces, such as wings, engine inlets, and nozzles, for example. In the illustrated embodiment of FIG. 2, the oscillating air jet assemblies 45 are centered about the 15 percent rotor blade chord position. In the embodiment of FIG. 3, the oscillating air jet assemblies 45 are placed near the trailing edge 51 of the rotor blade 47 to emulate aerodynamic effects resulting from use of a mechanical integral-type flap.

The oscillating air jet assemblies 45 may comprise oscillating diaphragms, such as disclosed in FIG. 1 or, alternatively, may comprise other means, such as, for example, electromagnetic for generating an oscillating air jet, such as disclosed in FIGS. 4–7, for example. The oscillating air jet assemblies of the present invention are primarily adapted for targeting local blade aerodynamics (blade geometry) rather than the vortex strength or the blade-vortex separation distance, for alleviation of helicopter rotor BVI. Other uses and effects, however, are also contemplated by the present invention in connection with the use of rotor blades and other aerodynamic surfaces.

FIG. 4 is a cross-section view illustrating an oscillating air jet assembly 61 installed within a rotor blade 63. The rotor blade 63 comprises a leading edge 65, a trailing edge 67, an upper surface 69, a lower surface 71, and an interior volume 73. The oscillating air jet assembly 61 generally comprises a piston 75, a diaphragm 77, an aerodynamic surface 79, a chassis 81, a magnet 85, and a voice coil 88. A plurality of apertures 90 are disposed in the aerodynamic surface 79. The oscillating air jet assembly 61 preferably comprises a single unit which can be secured into a recess in the upper surface 69 via mounting apertures 94. Screws or bolts may be inserted into the mounting apertures 94 and secured into a frame of the rotor blade 63, to thereby secure the oscillating air jet assembly 61 within the interior volume 73 of the rotor blade 63.

The piston 75 is secured by a preferably flexible diaphragm 77 to an underside of the aerodynamic surface 79 by means such as an adhesive, for example. The diaphragm 77 holds the piston 75 in close proximity to the plurality of apertures 90, and also holds the piston 75 in an orientation to place the voice coil 88 in close proximity to the magnet 85. The piston 75 preferably comprises a strong and light-wieght material, such as an aluminum honeycomb or other composite material. The diaphragm 77 preferably comprises a flexible material having both a resilient characteristic and a memory characteristic. As presently embodied, the flexible diaphragm comprises silicone rubber with a fiberglass reinforcement material added thereto. The diaphragm 77 preferably creates a sealed chamber between the piston 75 and the plurality of apertures 90 on the aerodynamic surface 79.

The voice coil 88 preferably comprises a cylindrical structure which is attached to a bottom surface of the piston 75. The piston 75 is also cylindrically shaped. A single wire is wound around a cylindrical wall to thereby form the voice coil 88. The wire is routed from the voice coil 88 to a conductor path 98. As presently embodied, the magnet 85 comprises a rare-earth material for providing a fixed magnetic field. Other means for providing a fixed magnetic field, however, may be used as is known in the art. For example, a single-wire winding may be used. The magnet 85 is preferably ring-shaped, to thereby accommodate the voice coil 88 therein.

An oscillating signal is fed from the conductor path 98 to the voice coil 88 to thereby generate an oscillating magnetic field, which when coupled with the fixed magnetic field from the magnet 85, produces electrodynamic forces for moving the piston 75. Movement of the piston 75 in a direction toward the plurality of apertures 90 forces air out through the aerodynamic surface 79. Similarly, movement of the piston 75 in a direction away from the apertures 90 draws air through the plurality of apertures 90 and into the aerodynamic surface 79.

As an alternative embodiment to the circular piston 75, voice coil 88, and magnet 85, other elliptical shapes may be implemented. According to one alterative embodiment, an oval shape may be used for the piston 75, the magnet 85, and the voice coil 88. The oval shapes of the elements 75, 85, 88 can extend along a length of the rotor blade 63 to provide a perhaps more advantageous configuration. An oval shape is contemplated to provide specific stability features which may be suitable for various specific acceleration forces which are experienced at different points along a rotating rotor blade.

The voice coil 88 may be energized via the conductor path 98 continuously or according to predefined parameters. A controller 100 can issue signals to the conductor path 98 via a juncture 102, for example. The controller 100 can receive and process information from an upper pressure sensor 105 and a lower pressure sensor 110.

Electrical signals can also be supplied to the conductive path 98 via another conductive path 112 which may be responsive to user inputs, for example. Power is supplied to the oscillating air jet assembly 61 via the other conductive path 112 or, alternatively, a local power source such as a battery (not shown) may be implemented. A conductive path 116 connects the controller 100 to the upper pressure sensor 105 and the lower pressure sensor 110, as presently embodied. In alternative embodiments where the piston 75 is driven continuously or where the piston 75 is driven from a source other than the controller 100, the controller 100 may be eliminated. Alternatively, the controller 100 may be positioned in other locations, such as a location outside of the rotor blade 63.

The single-wire winding disposed around the cylindrical wall, which is attached to the piston 75, is referred to herein as a voice coil 88 for illustrative purposes only. Voice coils of loud speakers, for example, comprise differently proportioned elements which are adapted to perform different functions than the elements of the oscillating air jet assembly 61. The voice coil 88 and piston 75 are configured, for example, to produce pressures which are on an order of magnitude greater than pressures produced by prior art loud speakers. Loud speakers, for example, do not typically comprise pistons 75 formed of lightweight, rigid materials. The plot illustrated in FIG. 8 shows peak velocity versus jet oscillation frequency, for diaphragms 25 of different stiffnesses. The plot 117 corresponding to a two-ply diaphragm 25 provides a larger peak velocity through the aperture 41, compared to the plot 119 corresponding to a single-ply diaphragm 25.

Additionally, a ratio of the voice coil 88 diameter to the piston 75 diameter is relatively small, compared to ratios of typical voice coil speaker systems. This ratio of the voice coil 88 diameter to the piston 75 diameter is preferably less than or equal to about one half and, in the illustrated embodiment, is equal to about 0.67.

The piston 75 is adapted to oscillate at relatively low frequencies, compared to piezoelectric diaphragms, such as the diaphragm 25 illustrated in FIG. 1. The relatively small volume of air between the piston 75 and the plurality of apertures 90 provides the oscillating air jet assembly 61 with a relatively large compression ratio, which is sufficient to generate relatively high velocities of air through the plurality of apertures 90. The spring rate and moving mass of the piston 75 and diaphragm 77 may be tuned to allow for an operation which is always at the system's natural frequency to further enhance efficiency. When utilized in a helicopter blade, for example, the mass of the oscillating air jet assembly 61 may be located at a forward location of the normal center of mass of the rotor blade 63. Consequently, the oscillating air jet assembly 61 may be substituted for the tip and/or leading edge weight which is typically present in a rotor blade.

FIGS. 5–7 disclose other oscillating air jet assembly embodiments. The discussion of FIG. 4 applies in large part to the discussion below with reference to FIGS. 5–7. The oscillating air jet assemblies of FIGS. 4–7 can be implemented in virtually any rotor blade and, additionally, can be constructed for use in fixed wing applications including engine inlets (for stall alleviation) and exhaust (for vectoring). The oscillating air jet assemblies of the present invention, including the device disclosed in FIG. 1, can further be used in non-aircraft applications and with other fluids in addition to air, in addition to the above-described applications of the invention. Similarly to the embodiment of FIG. 4, the oscillating air jet assemblies of FIGS. 5–7 are configured to output relatively high energy levels, compared to the embodiment of FIG. 1. All of the oscillating air jet assemblies of the present invention provide benefits including reduced mechanical complexity, reduced compromise of structural integrity, relatively simple manufacturing, reduced aerodynamic drag, reduced air-source power requirements, greater flexibility in placement and less impact on structure, and reduced radar detectability relative to the edges, gaps, and angles formed by conventional aerodynamic control surfaces or Coanda slots, for example.

In the embodiment of FIG. 5, like elements are designated with like reference numerals followed by the letter "a." The oscillating air jet assembly 120 comprises a voice coil 88a connected between a diaphragm 77a and a cone 124. The cone 124 may comprise a nickel electroform material, for example, and the diaphragm 77a is preferably constructed of a material suitable for holding and aligning the cone 124 within the magnet 85a.

In FIGS. 4–7, only a single oscillating air jet assembly is illustrated. Should a second oscillating air jet assembly be required for placement on the lower surface of the rotor blade, a second oscillating air jet assembly may be placed aft of the first oscillating air jet assembly. In FIG. 5, the first oscillating air jet assembly 120 extends between the 12.5 percent and the 22.5 percent blade chord positions. A second oscillating air jet assembly may be placed between the 22.5 percent and the 32.5 percent blade chord positions. Also, in the embodiments of FIGS. 4–7, the pressure sensors 105, 110 are disposed at the 5 percent blade chord position.

FIG. 6 illustrates an oscillating air jet assembly 130, according to the presently preferred embodiment. A piston 132, which preferably comprises an aluminum honeycomb material, is held in place by a first diaphragm 135 and a second diaphragm 137. Both the first diaphragm 135 and the second diaphragm 137 preferably comprise a silicone rubber having a fiberglass reinforcement. A connecting member 139, which preferably comprises aluminum, connects the piston 132 to the second diaphragm 137.

The combination of the first diaphragm 135 and the second diaphragm 137 provides sufficient strength, flexibility, and memory to properly align the voice coil 142 within the gaps of the magnet 145 during the dynamic operation of the rotor blade 63b. The fabrication of the connecting member 139 of aluminum provides for heat dissipation, to thereby dissipate heat generated by the voice coil 142, for example.

A sealed volume of air between the piston 132 and the plurality of apertures 90b is relatively small in the embodiment of FIG. 6, facilitating the generation of high jet pressures by the piston 132. In the embodiment of FIG. 6, for example, a first core 150 and a second core 152 are coupled to the magnet 145, to channel the magnetic flux from the magnet 145 to the voice coil 142. The first core 150 and the second core 152 form a gap, which accommodates the voice coil 142 therein. The first core 150 and the second core 152 help to align the voice coil 142, and further help to stabilize the voice coil 142 and prevent the voice coil 142 from contacting and rubbing against the cores 150, 152.

FIG. 7 illustrates another preferred embodiment of the present invention. In the embodiment of FIG. 7, like elements are denoted with like numerals, followed by the letter "c." The oscillating air jet assembly 155 of FIG. 7 generally comprises a piston 75c and a diaphragm 77c, both of which are similar to the piston 75 and the diaphragm 77 of FIG. 4. The oscillating air jet assembly 155 of FIG. 7 further comprises a voice coil 142c, a magnet 145c, a first core 150c, and a second core 152c, which are similar to the elements 142, 145, 150, and 152, respectively, of FIG. 6. As with the other illustrated embodiments, the chassis 81c is aluminum super plastic formed and the aerodynamic surface 79c comprises nickel hydroform.

The controller 100 can be used to instruct the piston 75, or the cone 124 to oscillate with various intensities and frequencies. Additionally, the controller 100 can instruct a lower piston (not shown) to oscillate with various intensities and frequencies, according to the present invention. Instructions to vary the parameters of operation of upper and lower pistons can be generated by a microprocessor (not shown), by the sensors 105, 110, or by other means such as a user input via the other conductive path 112. The instructions may alternatively originate within the controller 100.

Since BVI is typically felt by at least the outboard 40–50% of the rotor blade, the present invention contemplates multiple oscillating air jet assemblies along the length of the rotor blade. In addition to oscillating air jet assemblies incorporating cones or pistons, other oscillating air jet assemblies, such as the diaphragm disclosed in FIG. 1, for example, are contemplated by the present invention. In an embodiment having multiple oscillating air jet assemblies along the outboard 40–50% of the rotor blade, operation of the device is generally dependent on the sensitivity of the leading edge pressure sensors and detecting changes in the signs of the temporal gradients of the differential pressures. Also, since multiple interactions are usually present in helicopter rotor BVI, the frequency of the activation/deactivation of the lower and upper oscillating air jet assemblies will be proportional to the number of interactions being detected, for a given rotor blade radial station. The peak jet velocities and/or the jet oscillation frequencies may be tailored to the particular radial station, using higher peak jet velocities for the stronger interactions occurring near the tip of the rotor blade and lower peak velocities for the weaker interactions which occur at the more inboard radial stations of the rotor blade.

The oscillating air jet assemblies of the present invention do not require external equipment for adding and subtracting air mass, and thus, complex control systems for administering air to the rotor blades are not required. The power requirements for the oscillating air jet assemblies of the present invention are relatively small. For example, the piezoelectric cells comprising the diaphragm of FIG. 1 are typically driven with power requirements on the order of a few miliwatts.

The oscillating air jet assemblies of the present invention are able to the change the local aerodynamics of the air foil (blade) independent of the vortex strength, the blade/vortex separation distances, and the number of the blade/vortex encounters. Peak jet velocity and oscillation frequency are adaptable to changing BVI conditions which are associated with changes in the decent rate and forward flight speed. The adaptability of peak jet velocities and oscillation frequencies to changing BVI conditions, according to the present invention, presents an advantage over passive BVI noise control systems. Applications of the oscillating air jet assemblies of the present invention can be especially useful in low speed descent flight conditions, which typically give rise to BVI noise. The oscillating air jet assemblies can be deactivated or operated at new conditions, such as peak jet velocity and oscillation frequency, for other flight conditions, depending upon the desired effect. The oscillating air jet assemblies of the present invention can also be activated and deactivated for purposes such as lift augmentation during maneuvering flight, retreating blade lift enhancement during high-speed forward flight, and vibration reduction. The oscillating air jets of the present invention may also be used to address aerodynamic/dynamic blade twist modifications.

Although exemplary embodiments of the invention have been shown and described, many other changes, modifications and substitutions, in addition to those set forth in the above paragraphs, may be made by one having ordinary skill in the art with out necessarily departing from the spirit and scope of this invention.

We claim:

1. An active control device for reducing blade-vortex-interaction (BVI) noise generated by a rotorcraft, the active control device being adapted to be installed into a rotor blade of the rotorcraft, the rotor blade having a skin forming an aerodynamic surface of the rotor blade and surrounding an inner volume within the rotor blade, the active control device comprising:

a diaphragm disposed within the inner volume, the diaphragm having an outer periphery and an inner periphery, the outer periphery being adapted to be coupled to the skin of the rotor blade;

a rigid piston connected to the inner periphery of the diaphragm;

a wall coupled to the rigid piston; and a wire wound around the wall.

2. The active control device as recited in claim 1, wherein:

the diaphragm comprises an annular shape;

the rigid piston comprises a circular shape; and the wall comprises a cylindrical shape.

3. The active control device as recited in claim 1, wherein:

the diaphragm comprises an oval shape;

the wall comprises a cylindrical shape with an oval cross-section; and the rigid piston comprises an oval shape.

4. The active control device as recited in claim 1, wherein:

the wall comprises a first maximum diameter;

the rigid piston comprises a second maximum diameter; and a ratio of the first maximum diameter to the second maximum diameter is less than or equal to about one half.

5. The active control device as recited in claim 1, wherein:

the wall comprises a first maximum diameter;

the rigid piston comprises a second maximum diameter; and a ratio of the first maximum diameter to the second maximum diameter is equal to about 0.67.

6. The active control device as recited in claim 1, further comprising a second diaphragm coupled to the rigid piston.

7. The active control device as recited in claim 6, further comprising a connecting member, the connecting member extending radially from the rigid piston and connecting the rigid piston to the second diaphragm.

8. The active control device as recited in claim 1, the active control device further comprising:

an aerodynamic member which is adapted to fit adjacent to and to form a part of the skin;

a plurality of apertures disposed within the aerodynamic member;

wherein the outer periphery of the diaphragm is coupled to the aerodynamic member; and wherein the outer periphery of the diaphragm is coupled to the skin of the rotor blade via the aerodynamic member.

9. The active control device as recited in claim 8, the active control device further comprising:

a chassis connected to the skin of the rotor blade;

a magnet coupled to the chassis, the magnet comprising an elliptical shape; and wherein both the wall and wire are adapted to fit within the elliptically-shaped magnet.

10. The active control device as recited in claim 8 wherein:

the rigid piston is movable between a first configuration and a second configuration;

movement of the rigid piston from the first configuration to the second configuration pushes air away from the rigid piston and out through the plurality of apertures; and movement of the rigid piston from the second configuration to the first configuration draws air toward the rigid piston and in through the plurality of apertures.

11. An active control device for reducing blade-vortex-interaction (BVI) noise generated by a rotorcraft, the active control device being adapted to be installed into a rotor blade of the rotorcraft, the rotor blade having a skin forming an aerodynamic surface of the rotor blade and surrounding an inner volume of the rotor blade, the active control device comprising:

a diaphragm disposed within the inner volume, the diaphragm having a center point, a perimeter, a first surface, and a second surface opposite to the first surface;

a wall coupled to the second surface of the diaphragm, the wall having a center and a perimeter, whereby the centers of the diaphragm and the wall are placed into proximity when the wall is coupled to the second surface of the diaphragm, and whereby the perimeter of the wall does not extend beyond the perimeter of the diaphragm when the wall is coupled to the second surface of the diaphragm;

a coil wound around the wall; and a magnetic field producing member disposed around both the wall and the coil, whereby the wall and the coil are movable within the magnetic field producing member to thereby facilitate movement of the diaphragm.

12. The active control device as recited in claim 11, wherein the diaphragm comprises a nickle hydroform material.

13. The active control device as recited in claim 12, wherein the diaphragm comprises a cone shape.

14. The active control device as recited in claim 11, wherein the diaphragm comprises a rigid impermeable piston.

15. The active control device as recited in claim 14, wherein:

the wall comprises a first maximum diameter;

the rigid piston comprises a second maximum diameter; and a ratio of the first maximum diameter to the second maximum diameter is about one half.

16. The active control device as recited in claim 14, wherein:

the wall comprises a first maximum diameter;

the rigid piston comprises a second maximum diameter; and a ratio of the first maximum diameter to the second maximum diameter is equal to about 0.67.

17. The active control device as recited in claim 14, the active control device further comprising:

the diaphragm having an inner perimeter and an outer perimeter, the diaphragm having an annular shape defined between the inner perimeter and the outer perimeter, the outer perimeter being adapted to be coupled to the skin of the rotor blade;

an aerodynamic member which is adapted to fit adjacent to and to form a part of the skin; and a plurality of apertures disposed within the aerodynamic member.

18. The active control device as recited in claim 11, wherein:

the diaphragm comprises an oval shape;

the wall comprises a cylindrical shape with an oval cross-section; and the magnetic field producing member comprises an oval shape.

19. The active control device as recited in claim 11, wherein the diaphragm is disposed within the magnetic field producing member.

20. The active control device as recited in claim 11, wherein the magnetic field producing member comprises a single-wire coil.

21. The active control device as recited in claim 11, the active control device further comprising:
   an aerodynamic member which is adapted to fit adjacent to and to form a part of the skin, wherein the perimeter of the diaphragm is connected to the aerodynamic member; and
   a plurality of apertures disposed within the aerodynamic member.

22. The active control device as recited in claim 21 wherein:
   the diaphragm is movable between a first position and a second position;
   movement of the diaphragm from the first position to the second position pushes air away from the diaphragm and out through the plurality of apertures; and
   movement of the diaphragm from the second position to the first position draws air toward the diaphragm and in through the plurality of apertures.

23. An active control device for use on an aerodynamic structure having an outer skin and an interior volume, the outer aerodynamic skin surrounding the interior volume, the active control device comprising:
   at least one aperture disposed in the outer aerodynamic skin, the at least one aperture connecting the outer aerodynamic skin to the interior volume; and
   a diaphragm disposed in the interior volume, the diaphragm having an outer periphery and an inner periphery, the outer periphery being adapted to be coupled to the skin of the rotor blade;
   a rigid piston connected to the inner periphery of the diaphragm;
   a wall coupled to the rigid piston; and
   a wire wound around the wall;
   wherein the rigid piston is movable between a first position and a second position, wherein movement of the rigid piston from the first position to the second position pushes air through the at least one aperture and out of the interior volume; and
   wherein movement of the rigid piston from the second position to the first position draws air through the at least one aperture and into the interior volume.

24. The active control device as recited in claim 23, wherein the diaphragm and the rigid piston are oval-shaped.

25. The active control device as recited in claim 23, wherein the at least one aperture comprises a plurality of apertures disposed in the outer aerodynamic skin.

26. The active control device as recited in claim 23, wherein the rigid piston comprises nickel hydroform.

27. The active control device as recited in claim 23, wherein the rigid piston is disposed in an opposing fashion to and in proximity to the outer aerodynamic skin.

28. The active control device as recited in claim 23, further comprising:
   a chassis disposed within the interior volume and coupled to the outer aerodynamic skin; and
   a magnet disposed within the interior volume and coupled to the chassis.

29. The active control device as recited in claim 28, wherein:
   the wall comprises a cylindrical wall;
   the magnet comprises a ring-shaped magnet; and
   a diameter of the ring-shaped magnet is greater than a diameter of the cylindrical wall so that both the cylindrical wall and the wire fit within the ring-shaped magnet.

30. The active control device as recited in claim 29, wherein the rigid piston is adapted to generate pressures which are on an order of magnitude greater than pressures which a conventional loud speaker can generate and being adapted to generate peak velocities of air which are greater than about 120 ft/sec.

31. The active control device as recited in claim 23, the rigid piston being adapted to be driven at a frequency of up to about 800 Hz.

32. The active control device as recited in claim 23, and further comprising:
   means coupled to the outer skin for generating a fixed magnetic field; and
   means coupled to the wire for generating a changing magnetic field.

33. The active control device as recited in claim 32, the active control device further comprising a power supply coupled to the means for generating a changing magnetic field.

34. The active control device as recited in claim 33, wherein:
   the means for generating a fixed magnetic field comprises an elliptical-shaped magnet; and
   the means for generating a changing magnetic field comprises a current supply coupled to the wire.

35. The active control device as recited in claim 23, the active control device further comprising a sealed chamber connecting the diaphragm to the at least one aperture, whereby movement of the diaphragm and the rigid piston from the first position to the second position, and from the second position to the first position, results in air passing through substantially only the at least one aperture.

36. The active control device as recited in claim 23, wherein:
   the outer aerodynamic skin forms an aerodynamic surface, the aerodynamic surface comprising a leading edge and a trailing edge; and
   the at least one aperture is disposed ahead of a quarter chord location of the rotor blade near to but not on the leading edge.

37. The active control device as recited in claim 36, wherein the at least one aperture is disposed near a 15 percent chord position of the aerodynamic surface.

38. The active control device as recited in claim 36, wherein the at least one aperture is disposed between about a 12.5 percent chord position and about a 22.5 percent chord position.

39. The active control device as recited in claim 36, wherein the at least one aperture is disposed between about a 22.5 percent chord position and about a 32.5 percent chord position.

40. The active control device as recited in claim 23, wherein:
   (a) the at least one aperture comprises a plurality of apertures; and
   (b) the active control device further comprises:
      (1) at least one additional diaphragm disposed in the interior volume, the at least one additional diaphragm having an outer periphery and an inner periphery, the outer periphery being adapted to be coupled to the skin of the rotor blade;

(2) at least one additional rigid piston connected to the inner periphery of the at least one additional diaphragm diaphragm;

(3) at least one additional wall coupled to the at least one additional rigid piston; and (4) at least one additional wire wound around the at least one additional wall;

(c) the at least one additional rigid piston is movable between a first position and a second position, movement of the at least one additional rigid piston from the first position to the second position pushing air through the at least one aperture and out of the interior volume, and movement of the at least one additional diaphragm from the second position to the first position drawwing air through the at least one aperture and into the interior volume.

41. The active control device as recited in claim 40, wherein:

the outer aerodynamic skin forms an aerodynamic surface, the aerodynamic surface comprising a leading edge and a trailing edge; and the plurality of apertures are centered at about a 15 percent chord position of the aerodynamic surface.

42. The active control device as recited in claim 40, wherein:

the outer aerodynamic skin forms an aerodynamic surface, the aerodynamic surface comprising a leading edge and a trailing edge; and the plurality of apertures extend from about a 12.5 percent chord position to about a 22.5 percent chord position.

43. The active control device as recited in claim 40, wherein:

the outer aerodynamic skin forms an aerodynamic surface, the aerodynamic surface comprising a leading edge and a trailing edge; and the plurality of apertures extend from about a 22.5 percent chord position to about a 32.5 percent chord position.

44. The active control device as recited in claim 40, wherein:

the outer aerodynamic skin forms an aerodynamic surface, the aerodynamic surface comprising a leading edge and a trailing edge;

the plurality of apertures extend from about a 12.5 percent chord position to about a 22.5 percent chord position;

the active control device further comprises a second plurality of apertures; and the second plurality of apertures extend from about a 22.5 percent chord position to about a 32.5 percent chord position.

45. An active control device for reducing blade-vortex-interaction (BVI) noise generated by a rotorcraft, the active control device comprising:

a rotor blade including an outer skin, a leading edge, and a trailing edge;

a plurality of apertures disposed in the outer skin of the rotor blade; and a plurality of oscillating piston assemblies disposed within the rotor blade, each of the oscillating piston assemblies being movable between a first position and a second position, whereby movement of each piston assembly from the first position to the second position pushes air out of at least one of the plurality of apertures, and whereby movement of each piston assembly from the second position to the first position draws air into at least one of the plurality of apertures, each piston assembly comprising a diaphragm having an inner periphery and an outer periphery that is adapted to be coupled to the outer skin, a rigid piston connected to the inner periphery of the diaphragm, a wall coupled to the rigid piston and a wire wound around the wall.

46. The active control device as recited in claim 45, wherein each rigid piston comprises a nickel hydroform.

47. The active control device as recited in claim 45, wherein the plurality of oscillating piston assemblies is disposed ahead of a quarter chord location of the rotor blade near to but not on the leading edge.

48. The active control device as recited in claim 45, wherein the plurality of oscillating piston assemblies is disposed in proximity to the trailing edge of the rotor blade.

49. The active control device as recited in claim 45, wherein each oscillating piston assembly corresponds to a single aperture.

50. An active control device for use on an aerodynamic structure having an outer skin and an interior volume, the outer aerodynamic skin surrounding the interior volume, the active control device comprising:

at least one aperture disposed in the outer aerodynamic skin, the at least one aperture connecting the outer aerodynamic skin to the interior volume; and an electromagnetically-driven rigid piston disposed in the interior volume, the electromagnetically-driven rigid piston being movable between a first position and a second position, wherein movement of the electromagnetically-driven rigid piston from the first position to the second position pushes air through the at least one aperture and out of the interior volume at a peak velocity greater than about 120 ft/sec; and wherein movement of the electromagnetically-driven rigid piston from the second position to the first position draws air through the at least one aperture and into the interior volume at a peak velocity greater than about 120 ft/sec.

51. The active control device as set forth in claim 50, wherein the active control device further comprises:

(a) a diaphragm having an outer periphery and an inner periphery, the inner periphery of the diaphragm being coupled to the electromagnetically-driven rigid piston;

(b) a wall coupled to the electromagnetically-driven rigid piston; and (c) a wire wound around the wall.

52. The active control device as recited in claim 51, wherein:

(a) the at least one aperture comprises a plurality of apertures; and (b) the active control device further comprises:

(1) at least one additional electromagnetically-driven rigid piston disposed in the interior volume;

(2) at least one additional diaphragm having an outer periphery and an inner periphery, the inner periphery of the at least one additional diaphragm being coupled to the at least one additional electromagnetically-driven rigid piston;

(3) at least one additional wall coupled to the at least one additional electromagnetically-driven rigid piston; and (4) at least one additional wire wound around the at least one additional wall;

(c) the at least one additional electromagnetically-driven rigid piston is movable between a first position and a second position, movement of the at least one additional electromagnetically-driven rigid piston from the first position to the second position pushing air through the at least one aperture and out of the interior volume at a peak velocity greater than about 120 ft/sec, and movement of the at least one additional electromagnetically-driven rigid piston from the second position to the first position drawing air through the at least one aperture and into the interior volume at a peak velocity greater than about 120 ft/sec.

53. The active control device as set forth in claim 50, wherein:

the electromagnetically-driven rigid piston is constructed to be movable between the first position and the second position at an oscillation frequency which is less than about 200 Hz;

movement of the electromagnetically-driven rigid piston from the first position to the second position at an oscillation frequency of the electromagnetically-driven rigid piston of less than about 200 Hz pushes air through the at least one aperture and out of the interior volume at a peak velocity greater than about 120 ft/sec; and movement of the electromagnetically-driven rigid piston from the second position to the first position at an oscillation frequency of the electromagnetically-driven rigid piston of less than about 200 Hz draws air through the at least one aperture and into the interior volume at a peak velocity greater than about 120 ft/sec.

54. The active control device as set forth in claim 50, wherein:

the electromagnetically-driven rigid piston is constructed to be movable between the first position and the second position at an oscillation frequency which is less than about 200 Hz;

movement of the electromagnetically-driven rigid piston from the first position to the second position at an oscillation frequency of the electromagnetically-driven rigid piston of less than about 200 HZ pushes air through the at least one aperture and out of the interior volume at a peak velocity greater than about 150 ft/sec; and movement of the electromagnetically-driven rigid piston from the second position to the first position at an oscillation frequency of the electromagnetically-driven rigid piston of less than about 200 Hz draws air through the at least one aperture and into the interior volume at a peak velocity greater than about 150 ft/sec.

55. The active control device as set forth in claim 54, wherein the active control device further comprises:

(a) a diaphragm having an outer periphery and an inner periphery, the inner periphery of the diaphragm being coupled to the electromagnetically-driven rigid piston;

(b) a wall coupled to the electromagnetically-driven rigid piston; and (c) a wire wound around the wall.

56. The active control device as recited in claim 55, wherein:

(a) the at least one aperture comprises a plurality of apertures; and (b) the active control device further comprises:
(1) at least one additional electromagnetically-driven rigid piston disposed in the interior volume;
(2) at least one additional diaphragm having an outer periphery and an inner periphery, the inner periphery of the at least one additional diaphragm being coupled to the at least one additional electromagnetically-driven rigid piston;
(3) at least one additional wall coupled to the at least one additional electromagnetically-driven rigid piston; and
(4) at least one additional wire wound around the at least one additional wall;

(c) the at least one additional electromagnetically-driven rigid piston is movable between a first position and a second position, movement of the at least one additional electromagnetically-driven rigid piston from the first position to the second position pushing air through the at least one aperture and out of the interior volume at a peak velocity greater than about 120 ft/sec, and movement of the at least one additional electromagnetically-driven rigid piston from the second position to the first position drawing air through the at least one aperture and into the interior volume at a peak velocity greater than about 120 ft/sec.

57. The active control device as set forth in claim 50, wherein:

movement of the electromagnetically-driven rigid piston from the first position to the second position pushes air through the at least one aperture and out of the interior volume at a peak velocity greater than about 150 ft/sec, and movement of the electromagnetically-driven rigid piston from the second position to the first position draws air through the at least one aperture and into the interior volume at a peak velocity greater than about 150 ft/sec.

* * * * *